United States Patent
Huang et al.

(10) Patent No.: US 9,189,889 B2
(45) Date of Patent: Nov. 17, 2015

(54) METHOD FOR BUILDING A THREE-DIMENSIONAL MODEL AND APPARATUS THEREOF

(71) Applicant: INSTITUTE FOR INFORMATION INDUSTRY, Taipei (TW)

(72) Inventors: Szu-Hao Huang, Taipei (TW); Shang-Hong Lai, Hsinchu (TW); Ying-Cheng Pan, Keelung (TW); Hsing-Chun Chang, New Taipei (TW); Chin-Yun Fan, Hsinchu (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 186 days.

(21) Appl. No.: 14/100,001

(22) Filed: Dec. 8, 2013

(65) Prior Publication Data

US 2015/0138185 A1    May 21, 2015

(30) Foreign Application Priority Data

Nov. 20, 2013  (TW) .............................. 102142286 A

(51) Int. Cl.
  G06T 15/00    (2011.01)
  G06T 17/00    (2006.01)
  G06T 7/00     (2006.01)

(52) U.S. Cl.
  CPC ............... *G06T 17/00* (2013.01); *G06T 7/0071* (2013.01); *G06T 2200/08* (2013.01); *G06T 2207/10016* (2013.01); *G06T 2210/56* (2013.01)

(58) Field of Classification Search
  None
  See application file for complete search history.

(56) References Cited

U.S. PATENT DOCUMENTS

2013/0215221 A1\* 8/2013 Wang et al. ..................... 348/43
2014/0037194 A1\* 2/2014 Kitamura et al. ............. 382/154

\* cited by examiner

*Primary Examiner* — Kee M Tung
*Assistant Examiner* — Frank Chen
(74) *Attorney, Agent, or Firm* — CKC & Partners Co., Ltd.

(57) ABSTRACT

A method to build a 3D model for a physical object includes the following steps. First, depth information of a plurality of images is converted into a plurality of 3D point clouds. Then, the motion parameters of the camera to gather each image relative to a previous image are determined according to the 3D point clouds. Next, a registration energy estimate value of each image's 3D point cloud, as being integrated into a previous image's 3D point cloud, is determined according to corresponding motion parameters. Then, the motion parameters are varied to minimize the estimate value. An optimal camera path is determined according to the varied motion parameters. Finally, a 3D model of the physical object is built according the optimal camera path.

17 Claims, 3 Drawing Sheets

METHOD FOR BUILDING A THREE-DIMENSIONAL MODEL AND APPARATUS THEREOF

RELATED APPLICATIONS

This application claims priority to Taiwan Application Serial Number 102142286, filed Nov. 20, 2013, which is herein incorporated by reference.

BACKGROUND

1. Field of Invention

The invention relates to a building method, and particularly relates to a method and apparatus for building a three-dimensional model.

2. Description of Related Art

With the advance of the technique in image processing, the visual effect has been gradually expanded from two-dimensional (2D) plane to three-dimensional (3D) space. Typically, a single video camera is used to build a 3D image of an object. The video camera is positioned at different viewing angles to photograph the same physical object, thus obtaining a number of 2D images of the object. In addition, depth information corresponding to the 2D images are provided to carry distance information of the object in the 2D images. From the depth information, it can be derived that which 2D image is in the front of the frame, and, which one is in the rear of the frame. The depth information can accordingly be converted into 3D point clouds. Further, the rotation angle and the moving distance of the video camera can be decided according to two adjacent images' 3D point clouds. Then, according to the rotation angle and the moving distance, the two adjacent images' 3D point clouds are integrated to construct a part of the 3D image of the physical object. A complete 3D model of the physical object is generated when all 3D point cloud are integrated together.

However, as mentioned above, the two adjacent images' 3D point clouds are integrated according to the rotation angle and the moving distance of the video camera. Once a deviation occurs in calculating the rotation angle and the moving distance, the two adjacent images' 3D point clouds are unable to be integrated, which causes a failure in building the 3D model even with only a single calculation deviation. Moreover, in the typical method, the present image's 3D point cloud is integrated into the previous image's 3D point cloud following the present image is gathered and the rotation angle and the moving distance is decided. That is, the calculation deviation accumulates and cannot be corrected in real time until the 3D model is finished, which causes a 3D model very different from the physical object.

SUMMARY

Accordingly, the present invention provides a method to build a 3D model of a physical object. The method uses depth information of images of the physical object to build an optimal camera path. Then, the 3D point clouds of all images are integrated together according to the optimal camera path. The 3D point clouds of all images are integrated together after the optimal camera path is built. Therefore, the method can solve the 3D model building fail because of the integrated error.

An aspect of the invention is to provide a method to build a 3D model for a physical object. First, depth information of a plurality of images is converted into a plurality of 3D point clouds. Then, the motion parameters of the camera gathering each image relative to a previous image are determined according to the 3D point clouds. Next, a registration energy estimate value of each image's 3D point cloud as being integrated into a previous image's 3D point cloud is determined according to corresponding motion parameters. Then, the motion parameters are varied to minimize the estimate value. An optimal camera path is determined according to the varied motion parameters. Finally, a 3D model of the physical object is built according the optimal camera path.

Another aspect of the invention is to provide a computer readable storage medium having a software, wherein the software is processed by a processor to perform the following steps to build a 3D model of a physical object. First, depth information of a plurality of images is converted into a plurality of 3D point clouds. Then, the motion parameters of the camera to gather each image relative to a previous image are determined according to the 3D point clouds. Next, a registration energy estimate value of each image's 3D point cloud being integrated into a previous image's 3D point cloud is determined according to corresponding motion parameters. Then, the motion parameters are varied to minimize the estimate value. An optimal camera path is determined according to the varied motion parameters. Finally, a 3D model of the physical object is built according the optimal camera path.

A further aspect of the invention is to provide an apparatus to build a 3D model for a physical object. The apparatus includes an input, a converter, a motion parameter generator, a first calculator, a second calculator, a camera path generator and a 3D model generator. The input receives depth information of a plurality of images. The converter converts the depth information into a plurality of 3D point clouds. The motion parameter generator generates motion parameters of the camera to gather each image relative to gather a previous image according to the 3D point clouds. The first calculator calculates a registration energy estimate value of each image's 3D point cloud being integrated into a previous image's 3D point cloud according to a corresponding motion parameter. The second calculator varies the motion parameters to minimize the registration energy estimate value. The camera path generator determines an optimal camera path according to the varied motion parameters. The 3D model generator builds a 3D model of the physical object according the optimal camera path.

In view of the above, the 3D point clouds of all images are integrated together after the optimal camera path is built. Therefore, the method can solve the problem of the 3D model building fail because of the integrated error.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
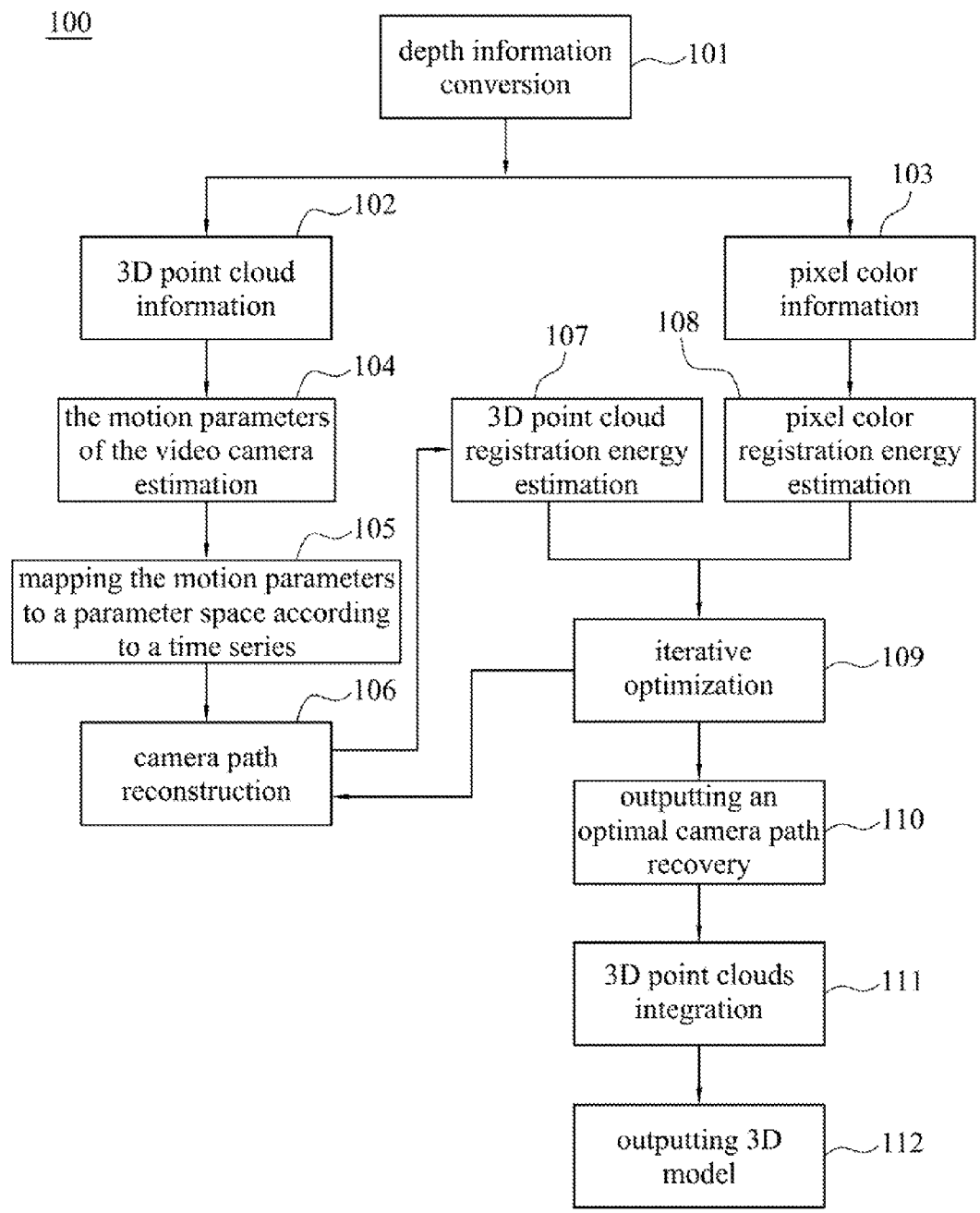
FIG. 1 illustrates a flow chart to build a three dimension (3D) model according to an embodiment of the invention.

Specific embodiments of the invention are described in details as follows with reference to the accompanying drawings, wherein throughout the following description and drawings, the same reference numerals refer to the same or similar elements and are omitted when the same or similar elements are stated repeatedly.

In the typical method, the present image's 3D point cloud is integrated into the previous image's 3D point cloud following the present image is gathered. That is, the wrong calculation result cannot be amended in real time. Therefore, the wrong calculation result is accumulated until the 3D model is finished, which will cause the final 3D model is very different from the physical object. Accordingly, for solving the above problem, the present image's 3D point cloud is not integrated into the previous image's 3D point cloud following the present image is gathered in the present invention. In contrast, after the video camera is positioned at different viewing angles to photograph the physical object, the motion parameters of the video camera are decided first. The motion parameters are amended according to a threshold value to build a camera path. Then, the camera path is optimized by varying the motion parameters to minimize the registration energy estimate. Finally, the 3D point clouds of all images are integrated together according to the optimal camera path. In other words, the 3D point clouds of all images are integrated together after the optimal camera path is built. Therefore, the method can solve the problem of 3D model building fail that results from the integrated error due to the wrong calculation result.

Figure 4:
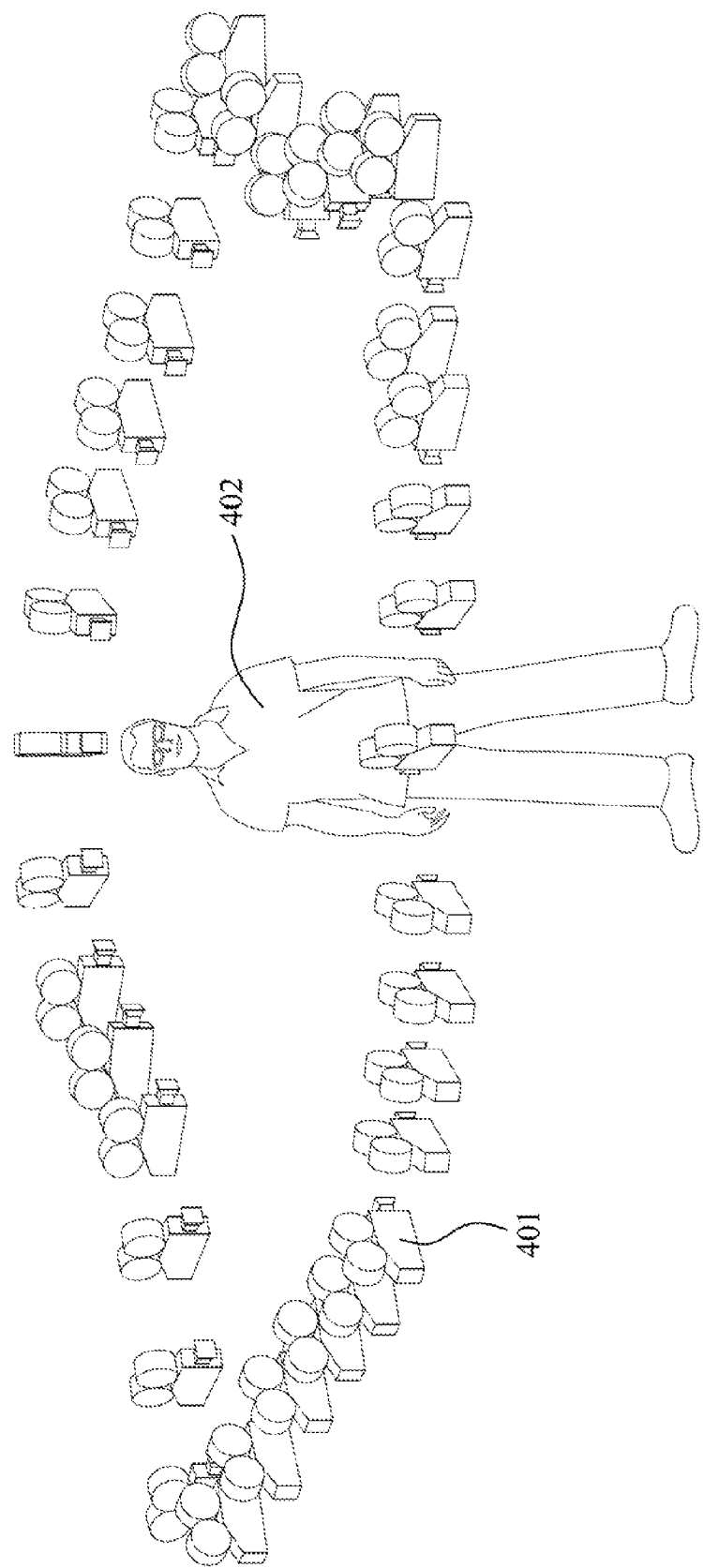
FIG. 4 illustrates a schematic diagram of a video camera positioned at different viewing angles to photograph a physical object according to an embodiment of the invention.

FIG. 1 illustrates a flow chart to build a 3D model according to an embodiment of the invention. According to this flow chart 100, a depth information conversion process is performed in step 101. The depth information is converted into 3D point cloud information in step 102 and pixel color information in step 103. In an embodiment, as shown in FIG. 4, a user takes a video camera 401 to photograph a physical object 402, such as a people. The video camera 401 is positioned at different viewing angles and surrounded the physical object 402 to photograph the physical object 402, thus obtaining a number of 2D images and related depth information. The depth information is converted into 3D point cloud information in step 102 and pixel color information in step 103. The above information is used to build an optimal camera path. Then, a 3D model of the physical object 402 is generated according to the optimal camera path. Accordingly, an inaccuracy integration problem among 3D point clouds can be resolved. In an embodiment, the video camera 401 is a Kinect developed by Microsoft. The Kinect includes a RGB camera for gathering color image, an infrared laser projector and a monochrome CMOS sensor. The monochrome CMOS sensor combined with the infrared laser projector forms a depth sensor to gather depth information. The depth information conversion process is performed by a software of Kinect for window SDK developed by Microsoft. When a user takes the Kinect to photograph a physical object, the Kinect gathers the color information and depth information of the physical object. Then, the depth information is converted into 3D point cloud by Kinect for window SDK.

In step 104, the motion parameters of the video camera are estimated. The motion parameters are estimated according to the viewing angles change of adjacent two images. The motion parameters include six parameters, rotation vectors [Rx Ry Rz] and moving vector [Tx Ty Tz]. Any adjacent two images may decide corresponding motion parameters to form a transformation matrix. In an embodiment, the 3D point cloud relationship of the present image and the previous image is described by the transformation matrix.

$$\begin{bmatrix} x' \\ y' \\ z' \\ 1 \end{bmatrix} = \begin{bmatrix} & & & T_x \\ & R_{3\times3} & & T_y \\ & & & T_z \\ & 0_{1\times3} & & 1 \end{bmatrix} \begin{bmatrix} x \\ y \\ z \\ 1 \end{bmatrix}$$

where $R=R_x(\theta_x)R_y(\theta_y)R_z(\theta_z)$
where $$R_x(\theta) = \begin{bmatrix} 1 & 0 & 0 \\ 0 & \cos\theta & -\sin\theta \\ 0 & \sin\theta & \cos\theta \end{bmatrix}$$

$$R_y(\theta) = \begin{bmatrix} \cos\theta & 0 & \sin\theta \\ 0 & 1 & 0 \\ -\sin\theta & 0 & \cos\theta \end{bmatrix}$$

$$R_z(\theta) = \begin{bmatrix} \cos\theta & -\sin\theta & 0 \\ \sin\theta & \cos\theta & 0 \\ 0 & 0 & 1 \end{bmatrix}$$

The position of the 3D point cloud of the previous image is (x, y, z). The position of the 3D point cloud of the present image is (x', y', z'). The viewing angle transformation of the present image and the previous image can be described by the motion parameters, rotation vectors [Rx Ry Rz] and moving vector [Tx Ty Tz]. In other words, the motion parameters can be decided based on the position of the 3D point cloud of the previous image and the position of the 3D point cloud of the present image. When a user uses a video camera to photograph a physical object, it is impossible for the user to cause a sudden change in the viewing angle of the video camera. That is, the viewing angle change, the motion parameters change, between two adjacent images gathered by a video camera should be smooth. Therefore, during building a camera path process, the viewing angle change is detected in real time and compared with a threshold. Once the viewing angle change is larger than the threshold, an interpolation method is used to amend the sudden change viewing angle to make a smooth viewing angle change. It is noticed that this step is only used to decide a reasonable camera path. The optimal camera path is decided by the following steps.

In step 105, the motion parameters are mapped to a parameter space according to a time series. That is, according to a continuous time axle, the motion parameters, rotation vectors [Rx Ry Rz] and moving vector [Tx Ty Tz], got in step 104 are mapped to a parameter space. The purpose of this step is to decide an optimal resolution of the motion parameters, rotation vectors [Rx Ry Rz] and moving vector [Tx Ty Tz]. An optimal camera path is decided according to the optimal resolution of the motion parameters. In an embodiment, the photo number of the video camera to continuous photograph the physical object is 100, and the depth information of two adjacent images can decide six motion parameters, rotation vectors [Rx Ry Rz] and moving vector [Tx Ty Tz], of the video camera. Accordingly, there are 600 motion parameters are used to estimate the camera path. In this step, the 600 motion parameters are mapped to a parameter space with 600 dimensions for deciding an optimal resolution in the following steps.

In step 106, an optimal camera path is decided. Each point in a parameter space corresponds to a camera path. When a parameter resolution in the parameter space is changed, the camera path is changed too. Therefore, this step is to find an optimal parameter resolution in the parameter space to decide an optimal camera path. For deciding an optimal camera path, after a camera path is built in step 106, the corresponding 3D point cloud registration energy is estimated in step 107 and the corresponding pixel color registration energy is estimated in step 108. In step 109, an iterative optimization method is used to calculate the above energy estimate values to get the motion parameters that can minimize the energy estimate values. The iterative optimization method is a Particle Swarm Optimization (PSO) method or a Genetic Algorithms (GA) method. After using the iterative optimization method to get the motion parameters that can minimize the energy estimate values, an optimal camera path is outputted in step 110. In contrast, after using the iterative optimization method to get the motion parameters that cannot minimize the energy estimate values, that is, the 3D point cloud registration energy estimate value or the pixel color registration energy estimate value is larger than a threshold, the step 106 is performed again to search a new camera path. After the new camera path is searched, the corresponding 3D point cloud registration energy is estimated again in step 107 and the corresponding pixel color registration energy is estimated again in step 108.

The 3D point cloud registration energy estimate value is used to decide the consistency of two adjacent 3D point clouds when they are integrated together according to the corresponding six motion parameters, rotation vectors [Rx Ry Rz] and moving vector [Tx Ty Tz]. The lower the registration energy estimate value is, the higher the consistency is. In other words, when two adjacent 3D point clouds have a higher consistency, that is, the 3D point cloud registration energy estimate value is low, the two adjacent 3D point clouds can be integrated together perfectly according to the corresponding motion parameters of the video camera taking the two images along the camera path. There is no hole in the integrated 3D point cloud. That is, this camera path matches the requirement. In contrast, when two adjacent 3D point clouds have a lower consistency, that is, the 3D point cloud registration energy estimate value is high, the two adjacent 3D point clouds can not be integrated together perfectly according to the corresponding motion parameters of the video camera taking the two images along the camera path. A hole exists in the integrated 3D point cloud. That is, this camera path does not match the requirement.

On the other hand, the pixel color registration energy estimate value is used to decide the pixel color consistency of two images when they are integrated according to the corresponding six motion parameters, rotation vectors [Rx Ry Rz] and moving vector [Tx Ty Tz]. The lower the pixel color registration energy estimate value is, the higher the pixel color consistency is. That is, the pixel color difference is lower. In other words, when the overlapping regions in the two adjacent 3D point clouds have a higher pixel color consistency, that is, the pixel color registration energy estimate value is low, the overlapping regions of two adjacent 3D point clouds can be integrated together perfectly according to the corresponding motion parameters of the video camera taking the two images along the camera path. That is, this camera path matches the requirement. It is noticed that the step to estimate the pixel color registration energy value is an optional step. That is, even though this step is removed, the optimal cameral path still can be got by performing the step to estimate the 3D point cloud registration energy value. When the step to estimate the pixel color registration energy value is removed, in step 109, the iterative optimization method is only used to calculate the 3D point cloud registration energy value.

After an optimal camera path is found in step 110, all the 3D point clouds are integrated together to build a 3D model in step 111. That is, according to the motion parameters along the optimal camera path, the 3D point cloud of the present image is sequentially integrated into that of the previous image. When all the 3D point clouds of the images are integrated together, a 3D model of the physical object is built in step 112.

Figure 2:
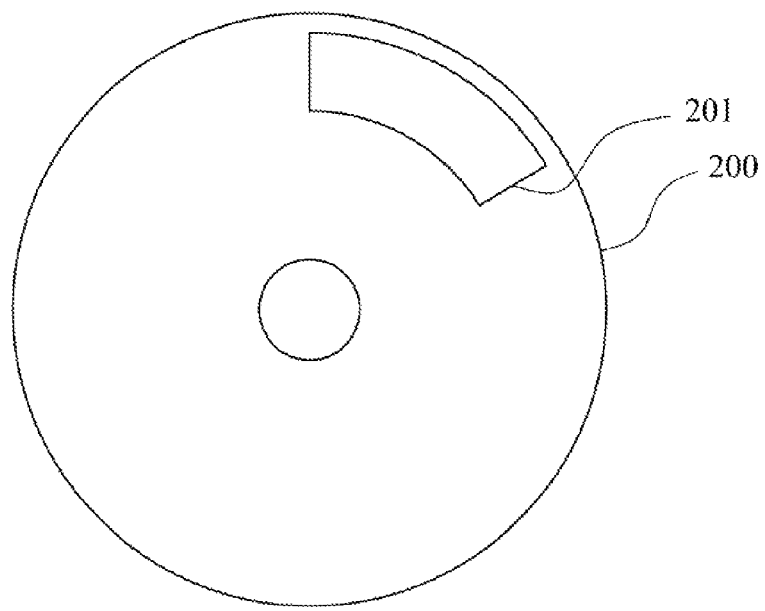
FIG. 2 illustrates a computer readable storage medium according to an embodiment of the invention.

FIG. 2 illustrates a computer readable storage medium according to an embodiment of the invention. The computer readable storage medium 200 includes a computer program 201. The computer program 201 includes instruction to make a processor to perform the flow chart 100 as shown in FIG. 1. The computer program 201 is realized by magnetizing the computer readable storage medium 200. However, although the computer readable storage medium 200 is a disc in FIG. 2, the computer readable storage medium 200 is also a hard disc, a solid state driver or a flash memory.

Figure 3:
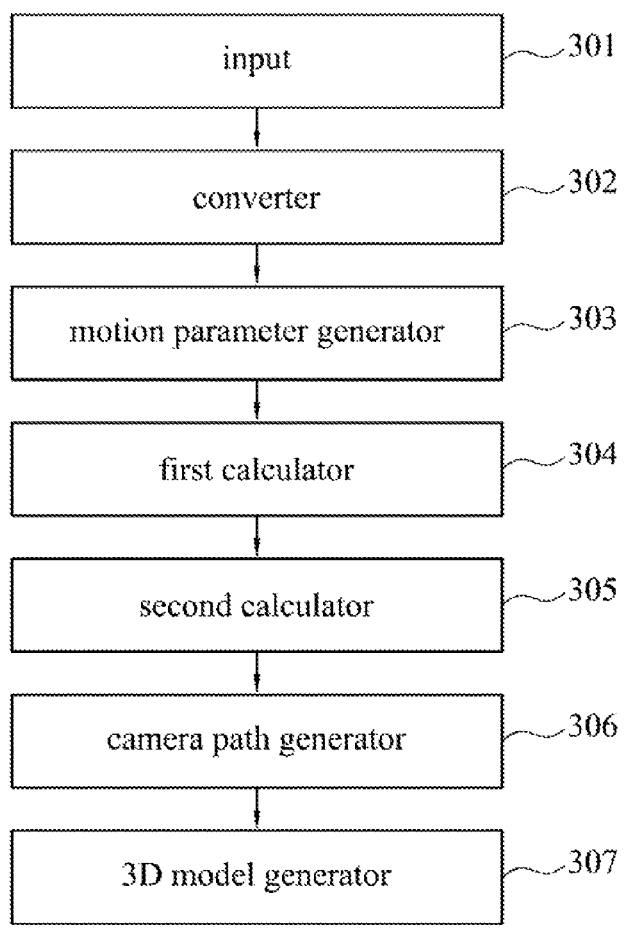
FIG. 3 illustrates an apparatus to build a 3D model according to an embodiment of the invention.

FIG. 3 illustrates an apparatus to build a 3D model according to an embodiment of the invention. The apparatus 300 includes an input 301, a converter 302, a motion parameter generator 303, a first calculator 304, a second calculator 305, a camera path generator 306 and a 3D model generator 307. The input 301 is used to receive the depth information of images. In an embodiment, as shown in FIG. 4, a user takes a video camera 401 to photograph a physical object 402, such as a people. The video camera 401 is positioned at different viewing angles and surrounded the physical object 402 to photograph the physical object 402, thus obtaining a number of 2D images and related depth information. Then, the depth information is transferred to the converter 302. The depth information is converted into 3D point cloud information and pixel color information by the converter 302.

The motion parameter generator 303 is used to generate the motion parameter and the motion parameter change of the video camera for gathering the present image related to gathering previous image according to the 3D point cloud information from the converter 302. The viewing angles change of adjacent two images is used to generate the motion parameter and the motion parameter change by the motion parameter generator 303. The motion parameters include six parameters, rotation vectors [Rx Ry Rz] and moving vector [Tx Ty Tz]. Any adjacent two images may decide corresponding motion parameters to form a transformation matrix. That is, the 3D point cloud relationship of the present image and the previous image is described by the transformation matrix. In other words, the motion parameters can be decided based on the position of the 3D point cloud of the previous image and the position of the 3D point cloud of the present image. Moreover, the motion parameter change is compared with a threshold by the motion parameter generator 303. Once the motion parameter change is larger than the threshold, an interpolation method is used to amend the sudden change motion parameter to make a smooth motion parameter change.

The first calculator 304 is used to calculate the 3D point cloud registration energy estimate value when the 3D point cloud of the present image is integrated into that of the previous images according to the corresponding motion parameters. The 3D point cloud registration energy estimate value is used to decide the consistency of two adjacent 3D point clouds when they are integrated together according to the corresponding motion parameters. The lower the registration energy estimate value is, the higher the consistency is. In other words, when two adjacent 3D point clouds have a higher consistency, that is, the 3D point cloud registration energy estimate value is low, the two adjacent 3D point clouds can be integrated together perfectly according to the corresponding motion parameters of the video camera taking the two images along the camera path. That is, this camera path matches the requirement. In contrast, when two adjacent 3D point clouds have a lower consistency, that is, the 3D point cloud registration energy estimate value is high, the two adjacent 3D point clouds can not be integrated together perfectly according to the corresponding motion parameters of the video camera taking the two images along the camera path. That is, this camera path does not match the requirement. At this time, the motion parameters are varied by the second calculator 305 to minimize the energy estimate values. The second calculator 305 uses the iterative optimization method to vary the motion parameters to minimize the energy estimate values. The iterative optimization method is a Particle Swarm Optimization (PSO) method or a Genetic Algorithms (GA) method. After using the iterative optimization method to find the optimal motion parameters that can minimize the energy estimate values, the camera path generator 306 generates a camera path according to the optimal motion parameters. Then, all the 3D point clouds are integrated together to build a 3D model by the 3D model generator 307. That is, according to the optimal motion parameters, the 3D point cloud of the present image is sequentially integrated into that of the previous image. When all the 3D point clouds of the images are integrated together, a 3D model of the physical object is built by the 3D model generator 307.

Accordingly, the method for building a 3D model is to calculate the motion parameters, the rotation vectors and the moving vector, of the camera. Then, a camera path is built according to the motion parameters. Next, the camera path is optimized by minimizing the registration energy estimate. Finally, the 3D point clouds of all images are integrated together according to the optimal camera path. In other words, the 3D point clouds of all images are integrated together after the optimal camera path is built. Therefore, the method can solve the problem of 3D model building fail because of the integrated error. Moreover, because the camera path can be amended before the 3D point clouds are integrated together, it is not necessary for a user to orientate the camera for photographing the physical object.

Although the invention has been disclosed with reference to the above embodiments, these embodiments are not intended to limit the invention. It will be apparent to those of skills in the art that various modifications and variations can be made without departing from the spirit and scope of the invention. Therefore, the scope of the invention shall be defined by the appended claims.

What is claimed is:

1. A method to build a 3D model for a physical object, comprising:
converting depth information of a plurality of images into a plurality of 3D point clouds, wherein the images are gathered by a camera surrounding the physical object to sequentially photograph the physical object;
respectively calculating motion parameters of the camera gathering each of the images relative to gathering a previous image according to the 3D point clouds;
calculating a registration energy estimate value of the 3D point cloud for each of the images as being integrated into the 3D point cloud of the previous image according to a corresponding motion parameter;
varying the motion parameters to minimize the registration energy estimate value;
determining an optimal camera path according to the varied motion parameters; and
building a 3D model of the physical object according the optimal camera path.

2. The method of claim 1, wherein building a 3D model of the physical object according the optimal camera path further comprises integrating the 3D point clouds according to the varied motion parameters.

3. The method of claim 1, wherein minimizing the registration energy estimate value uses a Particle Swarm Optimization (PSO) method or a Genetic Algorithms (GA) method.

4. The method of claim 1, further comprising converting the depth information of the plurality of images into pixel color information.

5. The method of claim 4, further comprising calculating a pixel color registration energy estimate value of the 3D point cloud of each of the images as being integrated into the 3D point cloud of the previous image according to a corresponding motion parameter.

6. The method of claim 1, wherein each of the motion parameters includes rotation vectors and moving vector.

7. The method of claim 1, wherein respectively calculating motion parameters of the camera gathering the images according to the 3D point clouds further comprises:
calculating a motion parameter change of the camera gathering each of the images relative to gathering the previous image;
determining whether or not the motion parameter change is in a set range; and
varying the motion parameters when the motion parameter change is out the set range.

8. The method of claim 7, wherein an interpolation method is used to vary the motion parameters.

9. A non-transitory computer readable storage medium having a software, wherein the software is processed by a processor to perform the method as claimed in claim 1.

10. An apparatus to build a 3D model for a physical object, comprising:
an input for receiving depth information of a plurality of images, wherein the images are gathered by a camera surrounding the physical object to sequentially photograph the physical object;
a converter for converting the depth information into a plurality of 3D point clouds;
a motion parameter generator for generating motion parameters of the camera gathering each of the images relative to gathering a previous image according to the 3D point clouds;
a first calculator for calculating a registration energy estimate value of the 3D point cloud of each of the images as being integrated into the 3D point cloud of the previous image according to a corresponding motion parameter;
a second calculator for varying the motion parameters to minimize the registration energy estimate value;
a camera path generator for determining an optimal camera path according to the varied motion parameters; and
a 3D model generator for building a 3D model of the physical object according the optimal camera path.

11. The apparatus of claim 10, wherein the 3D model generator integrates the 3D point clouds according to the varied motion parameters to build the 3D model of the physical object.

12. The apparatus of claim 10, wherein the second calculator uses a Particle Swarm Optimization (PSO) method or a Genetic Algorithms (GA) method to minimize the registration energy estimate value.

13. The apparatus of claim 10, wherein the converter further converts the depth information of the plurality of images into pixel color information.

14. The apparatus of claim 13, wherein the first calculator calculates a pixel color registration energy estimate value of the 3D point cloud each of the images being integrated into the 3D point cloud of the previous image according to a corresponding motion parameter.

15. The apparatus of claim 10, wherein each of the motion parameters includes rotation vectors and moving vector.

16. The apparatus of claim 10, wherein the motion parameter generator further calculates a motion parameter change of the camera gathering each of the images relative to gathering the previous image, and varies the motion parameters when the motion parameter change is out the set range.

17. The apparatus of claim 16, wherein an interpolation method is used to vary the motion parameters.

* * * * *